United States Patent
Fusama

(10) Patent No.: US 10,104,370 B2
(45) Date of Patent: Oct. 16, 2018

(54) THREE-DIMENSIONAL IMAGE DISPLAY DEVICE

(71) Applicant: Masaki Fusama, Kobe (JP)

(72) Inventor: Masaki Fusama, Kobe (JP)

( * ) Notice: Subject to any disclaimer, the term of this patent is extended or adjusted under 35 U.S.C. 154(b) by 316 days.

(21) Appl. No.: 15/188,107

(22) Filed: Jun. 21, 2016

(65) Prior Publication Data
US 2017/0034505 A1 Feb. 2, 2017

(30) Foreign Application Priority Data
Jul. 27, 2015 (JP) .................................. 2015-147908

(51) Int. Cl.
*H04N 9/47* (2006.01)
*H04N 13/398* (2018.01)
(Continued)

(52) U.S. Cl.
CPC ......... *H04N 13/398* (2018.05); *H04N 13/117* (2018.05); *H04N 13/128* (2018.05);
(Continued)

(58) Field of Classification Search
CPC .. H04N 13/398; H04N 13/366; H04N 13/117; H04N 13/31; H04N 13/383; H04N 13/128; H04N 2213/006
See application file for complete search history.

(56) References Cited

U.S. PATENT DOCUMENTS

| 6,111,597 A * | 8/2000 | Tabata ............... G02B 27/2264 345/8 |
| 6,545,650 B1 * | 4/2003 | Yamada ............. G02B 27/0093 345/7 |

(Continued)

FOREIGN PATENT DOCUMENTS

| JP | 3973907 B2 | 9/2007 |
| JP | 2010-72477 A | 4/2010 |

(Continued)

OTHER PUBLICATIONS

English translation of JP-2010-072477.*

*Primary Examiner* — Joseph G Ustaris
*Assistant Examiner* — Jill D Sechser
(74) *Attorney, Agent, or Firm* — Birch, Stewart, Kolasch & Birch, LLP

(57) ABSTRACT

A three-dimensional image display device includes: an image display screen 10; a motion parallax amount measurement unit 12 which measures a to-display-screen parallax angle $\Theta 1$ and a to-display-screen separation distance Le with respect to the screen 10; and a display unit 8 which selects a two-dimensional image of the object to be observed that has rotated by an angle $\Delta\Theta$ corresponding to the parallax angle $\Theta 1$, and transmits the two-dimensional image to the screen 10. Each of the plurality of two-dimensional images is associated with three-dimensional information; the three-dimensional information includes at least the rotational angle $\Delta\Theta$ and a virtual separation distance Lo between the object to be observed and the image display screen; and the rotational angle $\Delta\Theta$ of the object to be observed is determined on the basis of the following formula:

$\Delta\Theta = \Theta 1 \times Le/(Lo+Le)$.

11 Claims, 8 Drawing Sheets

(51) Int. Cl.
*H04N 13/128* (2018.01)
*H04N 13/31* (2018.01)
*H04N 13/383* (2018.01)
*H04N 13/117* (2018.01)
*H04N 13/366* (2018.01)

(52) U.S. Cl.
CPC ........... *H04N 13/31* (2018.05); *H04N 13/366* (2018.05); *H04N 13/383* (2018.05); *H04N 2213/006* (2013.01)

(56) References Cited

U.S. PATENT DOCUMENTS

| | | | |
|---|---|---|---|
| 8,194,073 B2 * | 6/2012 | Tokita | A63F 13/06 345/419 |
| 2004/0078298 A1 | 4/2004 | Fusama | |
| 2012/0229610 A1 * | 9/2012 | Fukushima | G02B 27/2214 348/47 |
| 2014/0036046 A1 * | 2/2014 | Hasegawa | H04N 13/0404 348/54 |
| 2014/0218472 A1 * | 8/2014 | Kim | H04N 13/376 348/43 |
| 2014/0306963 A1 | 10/2014 | Sun et al. | |

FOREIGN PATENT DOCUMENTS

| | | |
|---|---|---|
| JP | 2014-534656 A | 12/2014 |
| WO | WO 2011/048773 A1 | 4/2011 |
| WO | WO 2014/148673 A1 | 9/2014 |

\* cited by examiner

THREE-DIMENSIONAL IMAGE DISPLAY DEVICE

This application claims priority on Patent Application No. 2015-147908 filed in JAPAN on Jul. 27, 2015. The entire contents of this Japanese Patent Application are hereby incorporated by reference.

BACKGROUND OF THE INVENTION

Field of the Invention

The present invention relates to image display devices based on observer motion parallax.

Description of the Related Art

JP Patent No. 3973907 discloses an image data creating device and an image display device. These devices capture images of many parts, of an object to be imaged, including an inner surface, an outer surface, and positions before and after displacement, and store data of the images. An observer can select an image of a desired part of the object by operating a processing unit, to display the image on a display unit. However, with the image data creating device and the image display device, it is impossible to view a three-dimensional (3D) image based on observer motion parallax.

As a 3D image display device, a device using the binocular parallax of an observer is known. The device causes the right and left eyes of the observer to view image information different from each other. This operation allows the eyes of the observer to perceive the image as a 3D image. With the display device, the observer needs to wear special glasses. This is often pain for the observer.

Meanwhile, JP2014-534656 discloses an image display device using observer motion parallax, not binocular parallax. The image display device receives a plurality of two-dimensional (2D) images of a scene that is an object to be observed. 3D information associated with the scene is determined by using these 2D images, and a user viewing angle with respect to a display is determined. Next, in the image display device, the 3D information and the user viewing angle are used to present a generated image on the display. If the user moves with respect to the display, a correspondingly new user viewing angle is determined. The 3D information and the new user viewing angle are used to display a different generated image. The image display device is, so to say, a device that provides sequential three-dimensional perception. Here, such an image display device is also referred to as 3D image display device.

However, regarding the image display device disclosed in JP2014-534656, a relationship between a user viewing angle and a visual angle is not clear. That is, a specific method for determining a source image having a visual angle corresponding to a user viewing angle is not disclosed.

SUMMARY OF THE INVENTION

The present invention has been made in view of the above situation. An object of the present invention is to provide a 3D image display device and a 3D image display method that allow an image (referred to as 3D image) with a sequential three-dimensional change to be easily displayed in accordance with a relative displacement of the eyes of an observer with respect to an image display screen.

A 3D image display device according to the present invention includes:

an image display screen configured to display a 2D image of an object to be observed;

a motion parallax amount measurement unit configured to measure a to-display-screen parallax angle $\Theta 1$ and a to-display-screen separation distance $Le$ with respect to the image display screen; and a display unit configured to select, from a plurality of 2D images, a 2D image of the object to be observed that has rotated by an angle $\Delta\Theta$ corresponding to the to-display-screen parallax angle $\Theta 1$, and transmit the 2D image to the image display screen, wherein each of the plurality of 2D images is associated with 3D information, the 3D information includes at least the rotational angle $\Delta\Theta$ and a virtual separation distance $Lo$, and when the 2D image is selected by the display unit, the rotational angle $\Delta\Theta$ of the object to be observed is determined on the basis of the following formula:

$$\Delta\Theta = \Theta 1 \times Le/(Lo+Le),$$

wherein the to-display-screen parallax angle $\Theta 1$ is a motion parallax angle of an observer with respect to the image display screen and is identified by the motion parallax amount measurement unit, the to-display-screen separation distance $Le$ is a separation distance between an eye of the observer and the image display screen and is identified by the motion parallax amount measurement unit, the virtual separation distance $Lo$ is a virtual separation distance between the object to be observed and the image display screen and is determined when the image is generated, and the rotational angle $\Delta\Theta$ is a rotational angle of the object to be observed and is determined on the basis of $\Theta 1$, $Le$, and $Lo$ that are known.

Preferably, when the 2D image is selected by the display unit, the to-display-screen separation distance $Le$ in the formula is represented by the following formula:

$$Le = Le1 + \Delta Le, \text{ and}$$

the virtual separation distance $Lo$ in the formula is represented by the following formula:

$$Lo = Lo1 + \Delta Lo,$$

wherein $Le1$ in the formula is a separation distance between the eye of the observer and the image display screen before change, and is identified by the motion parallax amount measurement unit, $Lo1$ in the formula is a virtual separation distance between the object to be observed and the image display screen before change, and is determined when the image is generated, $\Delta Le$ in the formula is a change amount of the separation distance $Le1$ and is identified by the motion parallax amount measurement unit, and $\Delta Lo$ in the formula is a change amount of the virtual separation distance $Lo1$, is included in the 3D information, and is determined on the basis of the change amount $\Delta Le$.

Preferably, the virtual separation distance from the object to be observed, the object being displayed on the image display screen, to the image display screen is freely changed and set.

Preferably, when the 2D image is selected by the display unit, the $Lo$ in the formula is represented by the following formula:

$$Lo = Lo1/M,$$

wherein

Lo1 in the formula is a virtual separation distance between the object to be observed and the image display screen before change, and is determined when the image is generated, and M in the formula represents an optionally-settable scaling factor.

A 3D image display method according to the present invention includes the steps of:

measuring a to-display-screen parallax angle $\Theta 1$ and a to-display-screen separation distance Le with respect to an image display screen;

selecting, from a plurality of 2D images of an object to be observed, a 2D image of the object to be observed that has rotated by an angle $\Delta\Theta$ corresponding to the to-display-screen parallax angle $\Theta 1$; and displaying the 2D image selected in the selecting step on the image display screen, wherein each of the plurality of 2D images is associated with 3D information, the 3D information includes at least the rotational angle $\Delta\Theta$ and a virtual separation distance Lo, and when the 2D image is selected in the selecting step, the rotational angle $\Delta\Theta$ of the object to be observed is determined on the basis of the following formula:

$$\Delta\Theta = \Theta 1 \times Le/(Lo+Le),$$

wherein the to-display-screen parallax angle $\Theta 1$ is a motion parallax angle of an observer with respect to the image display screen and is identified in the measuring step, the to-display-screen separation distance Le is a separation distance between an eye of the observer and the image display screen and is identified in the measuring step, the virtual separation distance Lo is a virtual separation distance between the object to be observed and the image display screen and is determined when the image is generated, and the rotational angle $\Delta\Theta$ is a rotational angle of the object to be observed and is determined on the basis of $\Theta 1$, Le, and Lo that are known.

Preferably, when the 2D image is selected in the selecting step, the to-display-screen separation distance Le in the formula is represented by the following formula:

$$Le = Le1 + \Delta Le,\text{ and}$$

the virtual separation distance Lo in the formula is represented by the following formula:

$$Lo = Lo1 + \Delta Lo,$$

wherein

Le1 in the formula is a separation distance between the eye of the observer and the image display screen before change, and is identified in the measuring step, Lo1 in the formula is a virtual separation distance between the object to be observed and the image display screen before change, and is determined when the image is generated, $\Delta Le$ in the formula is a change amount of the separation distance Le1 and is identified in the measuring step, and $\Delta Lo$ in the formula is a change amount of the virtual separation distance Lo1, is included in the 3D information, and is determined on the basis of the change amount $\Delta Le$.

Preferably, the selection of the 2D image in the selecting step is either selection from 2D image data stored in a database or selection from 2D image data collected by a plurality of imaging units and transmitted simultaneously.

DESCRIPTION OF THE PREFERRED EMBODIMENTS

The following will describe in detail the present invention based on preferred embodiments with reference to the accompanying drawings.

Figure 1:
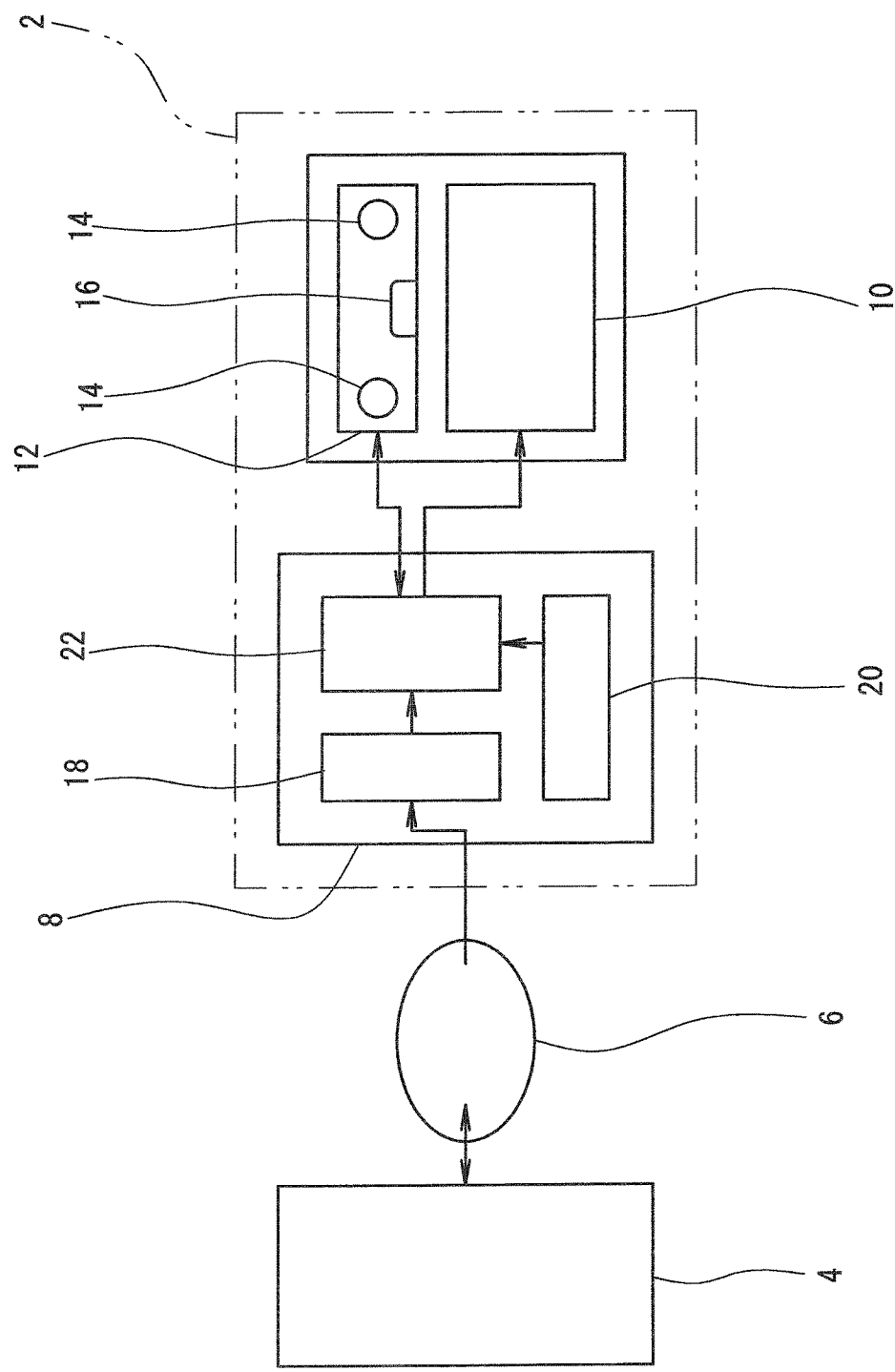
FIG. 1 is a block diagram schematically showing a 3D image display device according to an embodiment of the present invention.

FIG. 1 schematically shows a 3D image display device 2 according to an embodiment of the present invention. The 3D image display device 2 receives image data stored in a database 4, via a communication network 6, and displays the image data. The image data stored in the database 4 includes a large number of 2D images and 3D information corresponding to the 2D images. Examples of the 3D information include a rotational angle of an imaged object (referred to as object to be observed) from a reference position, and a separation distance between the object and an imaging unit. Examples of the communication network 6 include digital broadcasting, the Internet communication network, a LAN, and a narrow wired network.

The 3D image display device 2 includes a display unit 8, an image display screen (referred to merely as display screen) 10, and a motion parallax amount measurement unit 12. The display screen 10 corresponds to a personal computer including a tablet, a display such as a television, a smartphone, or the like, a screen for movie, or the like. Here, a display 10 is illustrated as the display screen. For example, a lightweight small-sized display such as a smartphone, a tablet personal computer, or the like can be easily and freely tilted, moved away, or moved close by an observer with their own hand. Meanwhile, if the display 10 is, for example, the screen of a personal computer, a television, or the like, one having a mechanism for tilting the screen is preferable. For example, the mechanism includes a twin-shaft motor for rotation and is able to swing.

The motion parallax amount measurement unit 12 identifies the attitude, the visual line, and the like of an observer viewing the display 10, and provides this information to a control section 22 described later. As the motion parallax amount measurement unit 12, a face/eye recognition camera 14 and a display screen tilt angle sensor 16 are adopted. The face/eye recognition camera 14 is fixed to the display 10 in a state of facing frontward. The display screen tilt angle sensor 16 is also mounted on the display 10.

The face/eye recognition camera 14 is a camera for recognizing and identifying the face and the eyes of the observer. The face/eye recognition camera 14 identifies the angle made by the visual line of the observer with respect to the surface of the display 10 (also referred to as the direction of the visual line), the position of intersection between the surface of the display 10 and the visual line of the observer (also referred to as focus point), and the separation distance between the eye of the observer and the focus point (a to-display-screen separation distance Le described later). In the case where a plurality of focus points are present, a corresponding focus point is inferred and identified on the basis of the angle made by the visual line of the observer. When the display 10 is tilted, the angle made by the visual line of the observer with respect to the surface of the display 10 changes. The changed angle is referred to as to-display-screen parallax angle. The face/eye recognition camera 14 is preferably a stereo type having at least two cameras disposed so as to be spaced apart from each other. The display screen tilt angle sensor 16 is a two-axis angle sensor. The display screen tilt angle sensor 16 performs angle measurement of tilt angles in the right-left direction and the up-down direction, and the like of the display screen, and calculation of an angular velocity, an angular acceleration, and the like. Thresholds for feature amounts (the direction of a straight line connecting the paired eyes of the observer, the dimension between the eyes, the tilt angle of the display 10, etc.) of the camera 14 and the sensor 16 are linked with each other and subjected to integrated evaluation. In the case where an observer of each display is limited, thresholds for the feature amounts of the observer are narrowed down beforehand by calibration at the time of setting of the camera 14 and the sensor 16. In addition, in the case where the observer of each display is limited, an approximate value of the to-display-screen separation distance Le can be identified by the camera 14 and the sensor 16 on the basis of the dimension between the eyes and the like.

The display unit 8 includes a transmitting/receiving section 18 that can perform a function of transmission and reception to and from the database 4 via the communication network 6. The display unit 8 includes an input section 20. The observer is allowed to perform selection of an image to be displayed on the display 10, changing and setting of a separation distance between the object to be observed and the imaging unit for the image, and the like, with the input section 20. The separation distance refers to an imaging separation distance L described later, or a virtual separation distance Lo between the object to be observed and the display screen. As the input section 20, a keyboard, a touch panel, the screen itself of the display 10, a mouse, or the like can be adopted. Changing the separation distance between the object to be observed and the imaging unit will be described later. In the case where data of a plurality of observation points (described later) are collected, the input section 20 also allows for an operation for selection of the observation point or the like.

The display unit 8 includes the control section 22. The control section 22 selects image data (a 2D image and 3D information) to be displayed, from the data stored in the database 4. The selection of the image data to be displayed is executed on the basis of instruction information from the input section 20, information from the motion parallax amount measurement unit 12, or the like. Examples of the instruction information from the input section 20 include selection of an image to be displayed, a later-described imaging separation distance Lo in an image, and a ratio (later-described M) of the imaging separation distance Lo. Examples of the information from the motion parallax amount measurement unit 12 include the focus point of the observer, the direction of the visual line of the observer, a later-described to-display-screen parallax angle $\Theta 1$, the to-display-screen separation distance Le, and a displacement thereof. These can be referred to as observer information. A method for selecting image data on the basis of the instruction information and the observer information described above will be described later.

Figure 2:
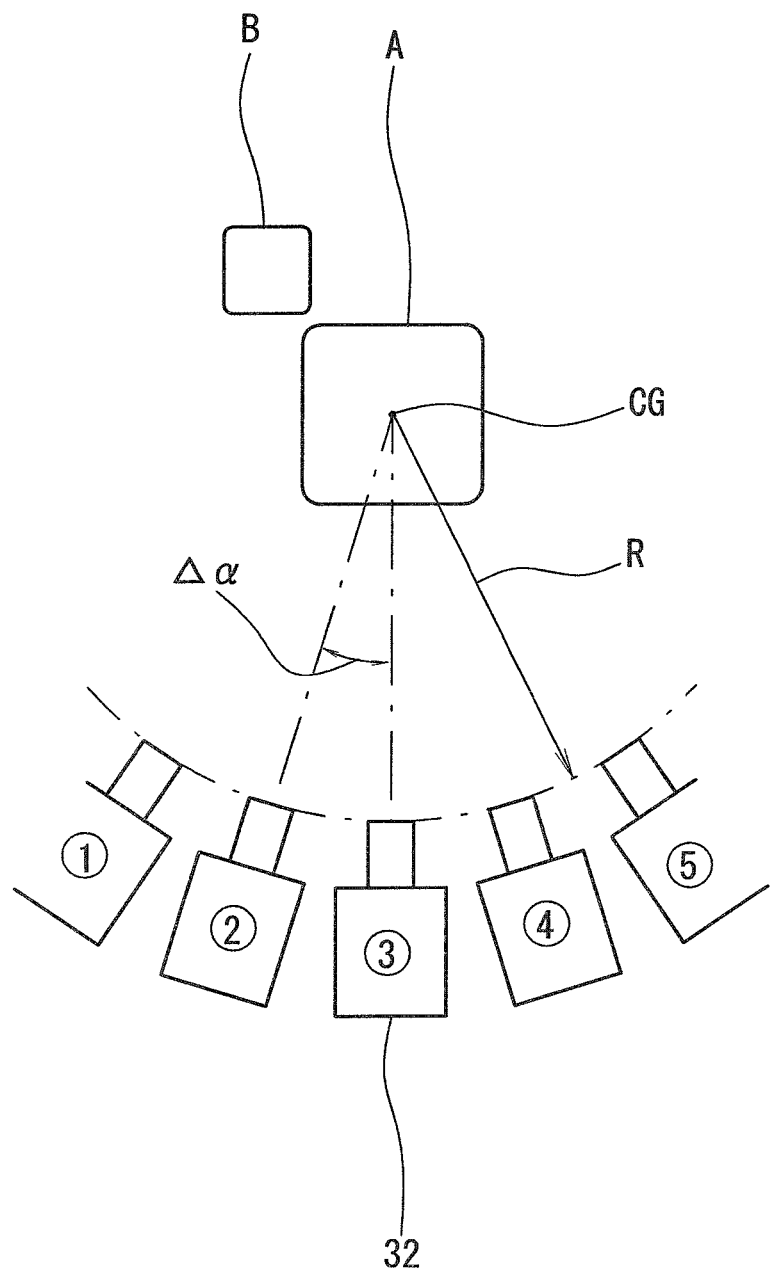
FIG. 2 is a plan view illustrating an example of a method for collecting 2D images.
Figure 3:
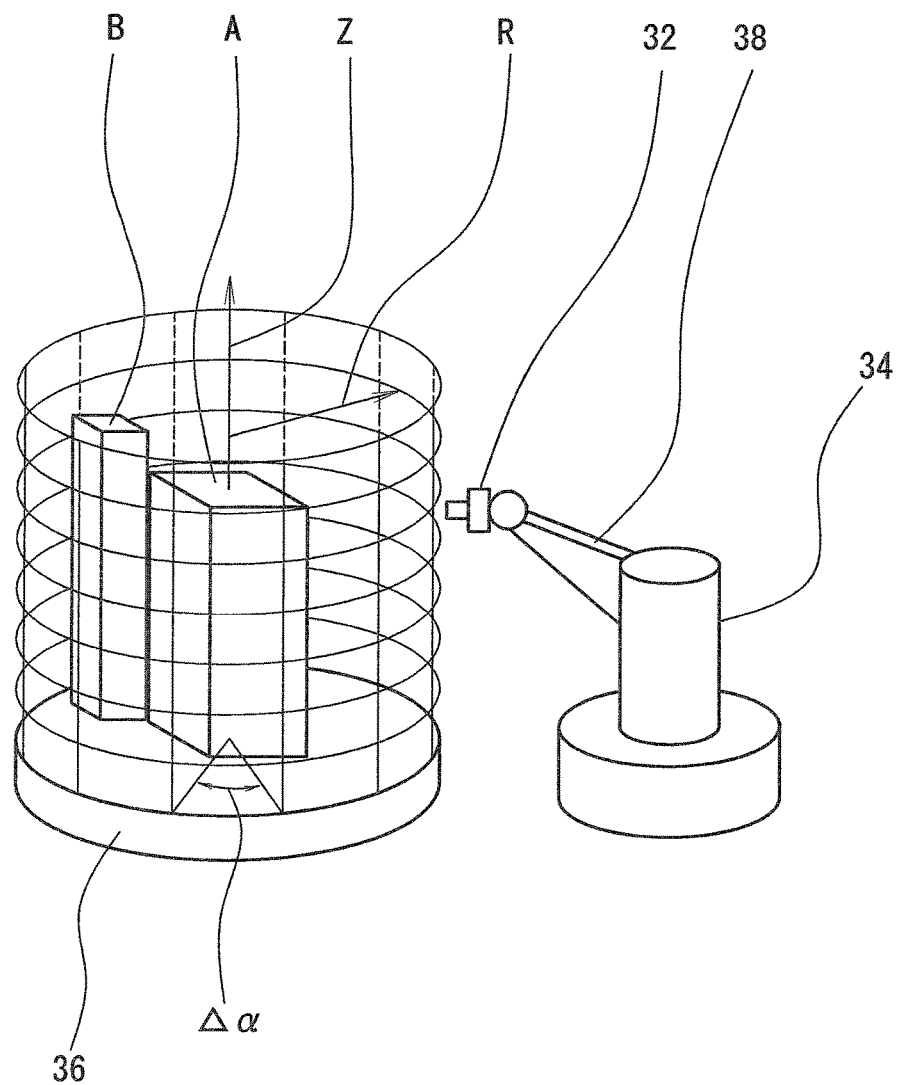
FIG. 3 is a perspective view illustrating another example of the method for collecting 2D images.

With reference to FIGS. 2 and 3, a method for collecting 2D images to be stored in the database 4 will be described. FIGS. 2 and 3 each show that the appearances of an object A and an object B that are objects to be observed are imaged to obtain images thereof. When the observer views each of these images, the observer generally does not discursively view the entire image, but concentrates on one point (observation point). The following will give a description with the observation point located at the center of gravity CG of the object A.

FIG. 2 shows a large number of imaging units 32 disposed in a predetermined shape with respect to the objects A and B. As each imaging unit 32, a still image camera, a moving image camera (video camera, etc.), or the like can be adopted. These cameras each include an automatic focus lens system. In this embodiment, the cameras 32 are disposed in a cylindrical shape so as to surround the objects A and B. A large number of cameras are arranged at regular angle $\Delta\alpha$ intervals on the circumference of a circle that is centered at the center of gravity CG of the object A and has a predetermined radius R. A large number of the circular arrangements are disposed at regular intervals in the up-down direction (a Z-axis direction). The directions of all the cameras 32 are directed to a vertical line passing through the center of gravity CG of the object A. The objects A and B are imaged by all the cameras 32. Accordingly, image data captured at predetermined angle $\Delta\alpha$ intervals about the Z axis and at predetermined intervals in the Z-axis direction are obtained. In addition to this, each camera 32 may image the objects A and B while moving, in the direction of the radius R, relative to the vertical line passing through the center of gravity CG of the object A. That is, each camera 32 may generate image data while moving away from and close to the objects A and B. The radius R corresponds to the imaging separation distance Lo in FIGS. 4 and 6 described later. FIG. 2 depicts a few of all the cameras 32 as representatives. Numbers of these cameras are defined as 1, 2, 3, 4, and 5. This camera arrangement is changeable in accordance with an object to be observed. For example, the camera arrangement can be a spherical arrangement, a partially spherical arrangement, a partially cylindrical arrangement, a planar arrangement, or the like.

FIG. 3 shows a method for collecting image data by using a robot 34 and a turntable 36. Also by the method, image data similar to those obtained by the large number of cameras disposed in a cylindrical shape can be easily collected. The object A and the object B, which are the objects to be observed, are placed on the turntable 36. In this embodiment, the rotational axis of the turntable 36 is caused to coincide with the vertical line (Z axis) passing through the center of gravity CG of the object A. However, the present invention is not limited to this method. The camera 32 is mounted on an arm 38 of the robot 34, and the arm 38 has a plurality of shafts. The robot arm 38 can rotate the camera 32 such that the optical axis thereof is turned about the vertical line and a horizontal line. The robot 34 can freely change the direction of the optical axis of the camera 32. The attitude of the camera 32 is maintained by the robot arm 38 such that, for example, the optical axis of the camera 32 passes through the observation point on the object A.

In this method, for example, the turntable 36 rotates at a constant speed, and the fixed camera 32 images the objects A and B at fixed time intervals. Accordingly, image data captured at regular angle Δα intervals in the direction of the circumference of a circle are obtained. Movement of the camera 32 by the robot 34 includes movements in the Z-axis direction (vertical direction) and the direction of the radius R (horizontal direction). With this configuration, the camera 32 is located on a virtual cylindrical surface about the rotational axis Z of the turntable 36. In addition, the direction of the optical axis of the camera 32 can be changed and set optionally by the robot 34. Therefore, the observation point can also be easily changed. In the case where the turntable 36 is rotated, if the background is made in a solid color, a process of neglecting the background is enabled.

At the stage of obtaining images, the above-described angle Δα, a position in the Z-axis direction, the radius R, the direction of the optical axis of the camera, and the like can be the 3D information of each 2D image. The angle Δα can correspond to a corresponding rotational angle ΔΘ of the object to be observed in FIGS. 4 and 6 described later. The radius R can correspond to the imaging separation distance Lo in FIGS. 4 and 6 described later. In the database 4, all the 2D images are associated with unique 3D information. In each of the methods in FIGS. 2 and 3, normally, the angle Δα, the position in the Z-axis direction, the radius R, the direction of the optical axis of the camera, and the like are values from a predetermined reference position. The imaging unit is not limited to the camera disposed on the ground as described above, and, for example, a camera mounted on an apparatus movable in the air, such as a helicopter, a man-made satellite, or the like, can be adopted. Examples of objects to be observed include stationary objects such as the objects A and B as well as moving objects such as animals and humans. Preferably, a moving object is imaged simultaneously by the large number of imaging units 32 shown in FIG. 2 to collect image data, rather than by the method shown in FIG. 3.

Figure 4:
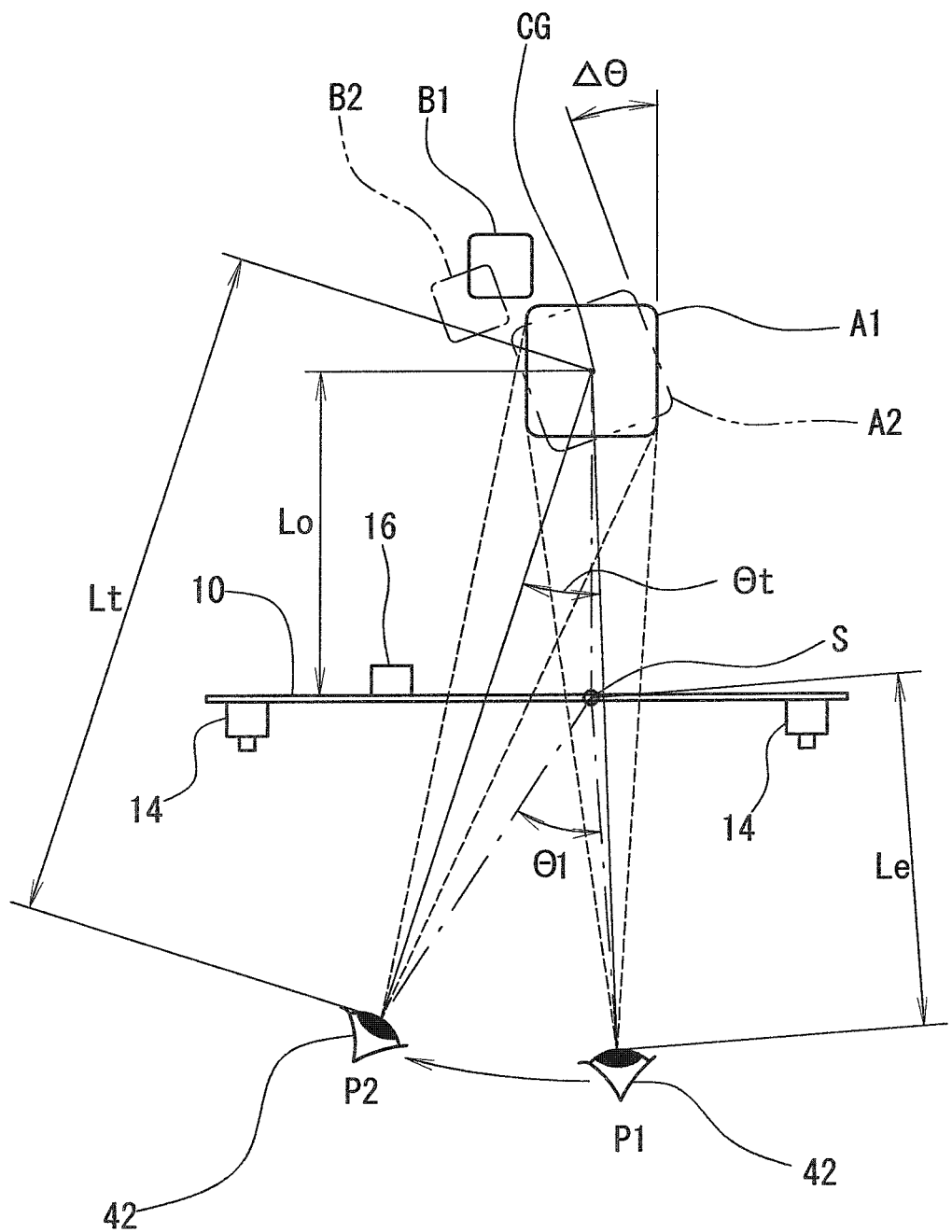
FIG. 4 is a plan view illustrating an example of a process for selecting a 2D image on the basis of motion parallax of an observer.

FIG. 4 shows an example of a process for selecting a 2D image to be displayed on the display 10, on the basis of motion parallax of the observer. FIG. 4 is a plan view. In FIG. 4, an eye 42 of the observer views an image of the objects A and B, which are the objects to be observed, on the screen of the display 10. The image is, for example, designated by the observer through the input section 20 (FIG. 1) of the 3D image display device 2. In FIG. 4, the presence and the positions of the objects A and B shown above the display 10 are virtual. Actually, an image of the objects A and B is present on the display 10. The observer views the objects A and B shown above the display 10 in FIG. 4, by adjusting the visual line of the observer to a focus point S on the display 10. The focus point S on the display 10 at which the observer looked corresponds to the observation point CG on the object A.

In the example shown in FIG. 4, the distance Le from the eye 42 to the focus point S is unchanged. The distance Le is the separation distance between the eye 42 of the observer and the display 10, and is referred to as to-display-screen separation distance Le. The to-display-screen separation distance Le is measured by the face/eye recognition camera 14 and recorded.

In the drawing, the distance Lo is the above-described imaging separation distance. In the case where a displayed image is a captured image, the distance Lo is the separation distance between the object to be observed and the imaging unit (camera). In addition, the distance Lo can be regarded as a virtual separation distance between the object to be observed and the display screen 10.

Figure 5:
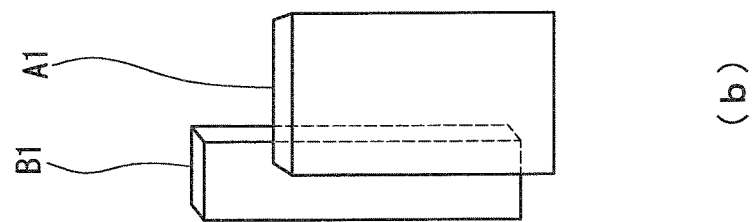
FIG. 5 is a perspective view showing an example of a 2D image obtained by the process shown in FIG. 4.
Figure 5:
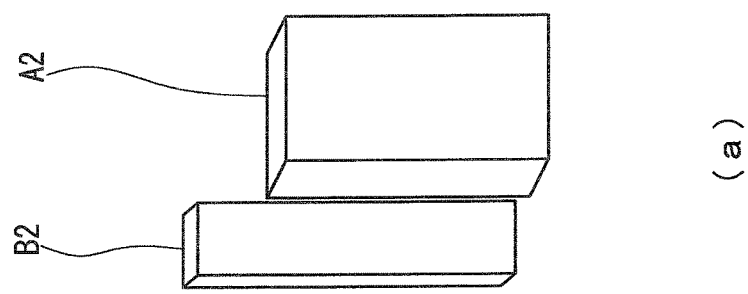

In FIG. 4, the same eye 42 of the observer moves slightly from an initial position P1 to the next position P2. FIG. 5 shows an image on the display 10 which image has been changed along with the positional change of the eye 42. As shown in FIG. 4, during the positional change of the eye 42, the focus point on the display 10 remains fixed at the point S on the screen. In other words, the positional change of the eye 42 corresponds to the surface of the display 10 being rotated about the focus point S in a state where the eye 42 is fixed. The rotational angle is indicated by Θ1. The rotational angle Θ1 is measured by the face/eye recognition camera 14 and the display screen tilt angle sensor 16 of the motion parallax amount measurement unit 12 shown in FIG. 1, and recorded. The rotational angle Θ1 is an observer motion parallax angle with respect to the display 10, and is referred to as to-display-screen parallax angle here.

The image of the objects A and B viewed by the eye 42 at the initial position P1 is objects A1 and B1 shown by solid lines in the drawing. The image of the objects A1 and B1 viewed by the eye 42 at the position P1 is as shown in (b) of FIG. 5.

In the case of not changing a displayed image when the display 10 rotates or when the position of the eye 42 changes, the image that can be viewed even by the eye 42 at the position P2 remains as the image shown in (b) of FIG. 5 and is not changed. However, in the present embodiment, as shown in FIG. 4, when the display 10 is rotated or when the position of the eye 42 is changed along the circumferential direction, the image viewable on the display 10 is changed in accordance with this rotation or this positional change. That is, a 2D image is three-dimensionally changed on the basis of the motion parallax of the observer. When the position of the eye 42 rotates clockwise toward P2, the image rotates anticlockwise. In other words, when the position of the eye 42 is fixed at P1 and the display 10 rotates by the angle Θ1, objects A2 and B2 shown by alternate long and two short dashes lines in the drawing are displayed on the display 10. These objects are an image shown in (a) of FIG. 5. The image of the objects A and B that have rotated along with the rotation of the display 10 is displayed. The selection of an image to be displayed is performed by the control section 22 shown in FIG. 1. The control section 22 selects corresponding 3D information and a 2D image corresponding to this 3D information, from the database 4 on the basis of information from the motion parallax amount measurement unit 12, and transmits the 3D information and the 2D image to the display 10.

The rotational angle ΔΘ of the objects A and B corresponding to the above-described to-display-screen parallax angle Θ1 is obtained by the control section 22 as follows. The rotational angle ΔΘ is obtained by the following formula (1):

$$\Delta\Theta = \Theta t = \Theta 1 \times Le/(Lo+Le) \tag{1}$$

Wherein

ΔΘ (unit: radian) is the above-described corresponding rotational angle of the object to be observed, Θt (unit: radian) is a virtual observer motion parallax angle, that is, a virtual observer motion parallax angle with respect to the object to be observed when the actual objects A and B are viewed on the assumption that the shown display 10 does not exist, Θ1 (unit: radian) is the above-described to-display-screen parallax angle, that is, the observer motion parallax angle with respect to the display, Le is the above-described to-display-screen separation distance, that is, the separation distance between the eye 42 of the observer and the display, and Lo is the above-described imaging separation distance, that is, the separation distance between the object to be observed and the imaging unit (camera) in the case where a displayed image is a captured image. In addition, the separation distance Lo can be regarded as the virtual separation distance between the object to be observed and the display screen. The separation distance Lo is included in the 3D information. The separation distance Lo is a known value in the above formula (1) as described below.

Regarding the imaging separation distance (virtual separation distance between the object to be observed and the display screen) Lo in the above formula (1), a large number of distances Lo are present for one object to be observed. The imaging separation distance Lo is originally a value that is selectable. However, the imaging separation distance Lo may be automatically set to a specific value when the display 10 is switched on. For example, the imaging separation distance Lo may be set to any one of the intermediate value, the minimum value, the maximum value, or the like among a large number of imaging separation distances Lo for one object to be observed. As a result, in the above formula (1), the imaging separation distance Lo becomes known. In addition, when the observer views the display 10, designating any imaging separation distance Lo through the input section 20 may be set as a condition. In addition, the value of the imaging separation distance Lo at the time when viewing the same object to be observed with the display 10 last time is finished may be designated. In this manner, in the above formula (1), the imaging separation distance Lo becomes known.

By the above formula (1), 3D information ΔΘ of a corresponding image is obtained from the known information Le and Lo including the to-display-screen parallax angle Θ1, which is the observer motion parallax angle. Then, a 2D image corresponding to the 3D information is selected. The to-display-screen parallax angle Θ1 is identified by the face/eye recognition camera 14 and the display screen tilt angle sensor 16 described above. The to-display-screen separation distance Le is identified by the face/eye recognition camera 14. The imaging separation distance Lo is determined, for example, at the time when the display 10 is switched on. The to-display-screen parallax angle Θ1 and the rotational angle ΔΘ of the object to be observed are not limited to angles in the horizontal direction, and include angles in any direction. The direction of the visual line of the observer is not limited to a horizontal direction.

In FIG. 4, a distance Lt is the virtual separation distance between the eye 42 of the observer and the object A1 (A2) to be observed. That is, the distance Lt is the separation distance between the eye 42 of the observer and the object to be observed when the actual objects A and B are viewed on the assumption that the shown display 10 does not exist, and is a distance that does not exist in reality. The distance Lt corresponds to the sum of the imaging separation distance Lo and the to-display-screen separation distance Le.

In FIG. 4, for easy understanding, the positional change of the eye 42 is depicted larger than the actual change. That is, all the angles Θ1, Θt, and ΔΘ are depicted larger than the actual angles. Actually, all the angles Θ1, Θt, and ΔΘ are slight angles. Accumulation of slight-angle movements (slight movements) of the eye 42 or accumulation of slight-angle tilts of the display 10 results in a great parallax angle as shown.

The above description is the case where a relative displacement between the eye 42 of the observer and the display 10 is circular movement about the object A to be observed with the radius R (=Le) unchanged. However, when the observer actually views the screen of a smartphone or the like, movement away from and close to the object A to be observed is added to the circular movement in many cases. First, the case where a relative displacement between the eye 42 of the observer and the display 10 does not include circular movement and is only linear movement away from and close to the object A to be observed will be described as follows.

Figure 6:
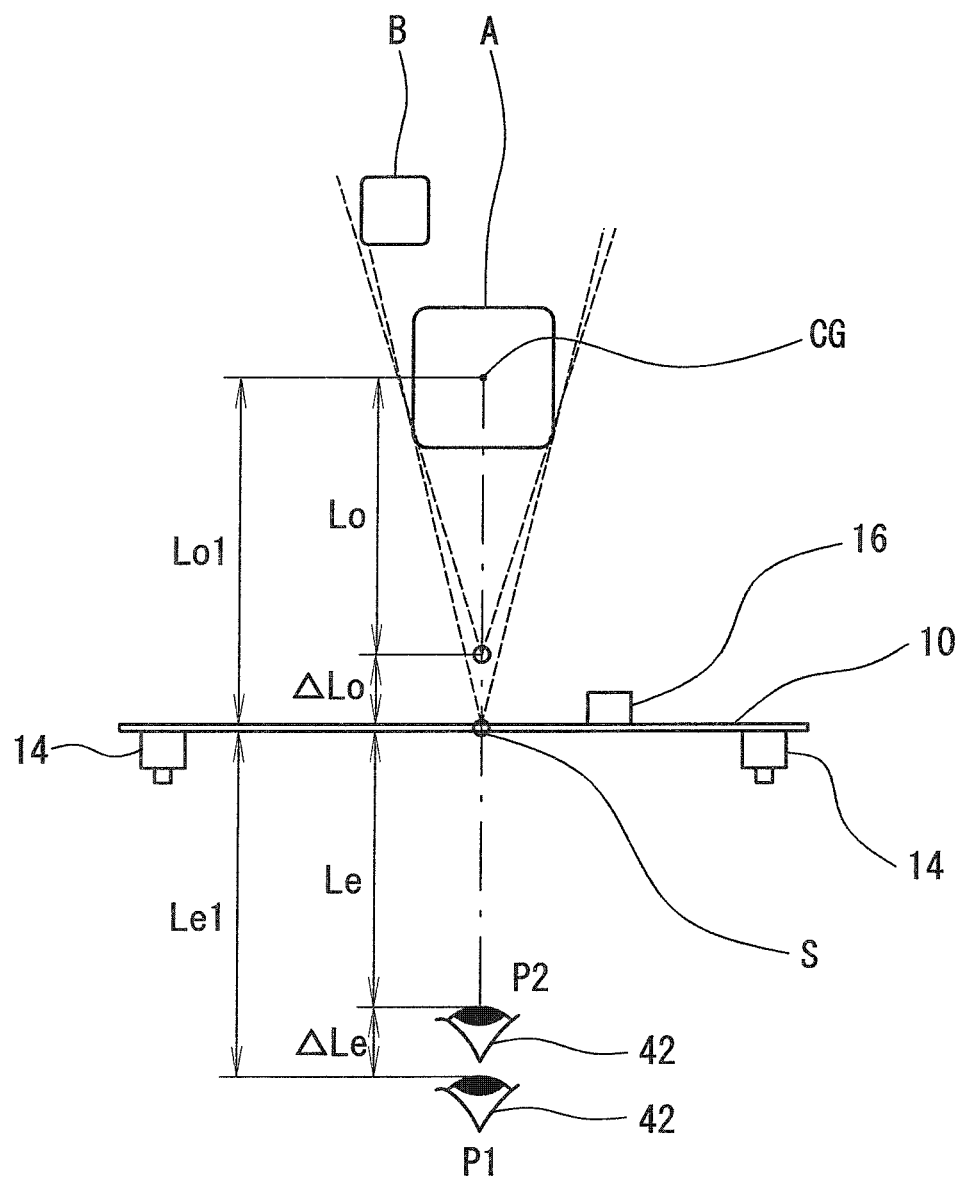
FIG. 6 is a plan view illustrating another example of the process for selecting a 2D image on the basis of motion parallax of an observer.

FIG. 6 shows an example where the eye 42 of the observer moves close to the surface of the display 10 linearly in a direction perpendicular to the surface of the display 10. Initially, the eye 42 of the observer is located at an initial position P1. The to-display-screen separation distance at this time is denoted by Le1. When the to-display-screen separation distance is Le1, an image for which the imaging separation distance is Lo1 is displayed on the display 10. As described above, Le1 and Lo1 represent distances prior to a change of the relative position between the eye 42 and the display 10. Next, the eye 42 moves close to the display 10 by a distance ΔLe and reaches a position P2. The to-display-screen separation distance Le after the close movement is represented by the following formula (2). The displacement ΔLe at the time of close movement is a negative value. The displacement ΔLe at the time of away movement is a positive value.

$$Le = Le1 + \Delta Le \qquad (2)$$

The control section 22 selects 3D information corresponding to the position P2 of the eye 42 after the positional change of the eye 42, on the basis of the positional change. The control section 22 selects a 2D image corresponding to the 3D information and transmits the 2D image to the display 10. The imaging separation distance Lo that is the 3D information is represented by the following formula (3). A displacement ΔLo at the time of close movement is a negative value. The displacement Δ Lo at the time of away movement is a positive value.

$$Lo = Lo1 + \Delta Lo \qquad (3)$$

As described later, in the present embodiment, the displacement ΔLo is made equal to ΔLe as represented in the following formula (4).

$$\Delta Lo = \Delta Le \qquad (4)$$

That is, on the display 10, an image obtained when the imaging separation distance is Lo1 is changed to an image obtained when the imaging separation distance is Lo1+ΔLe. The present invention is not limited to ΔLo=ΔLe. As shown by alternate long and short dash lines in FIG. 6, the visual angle with respect to the objects A and B changes on the image when the eye 42 moves close to the surface of the display 10.

Figure 7:
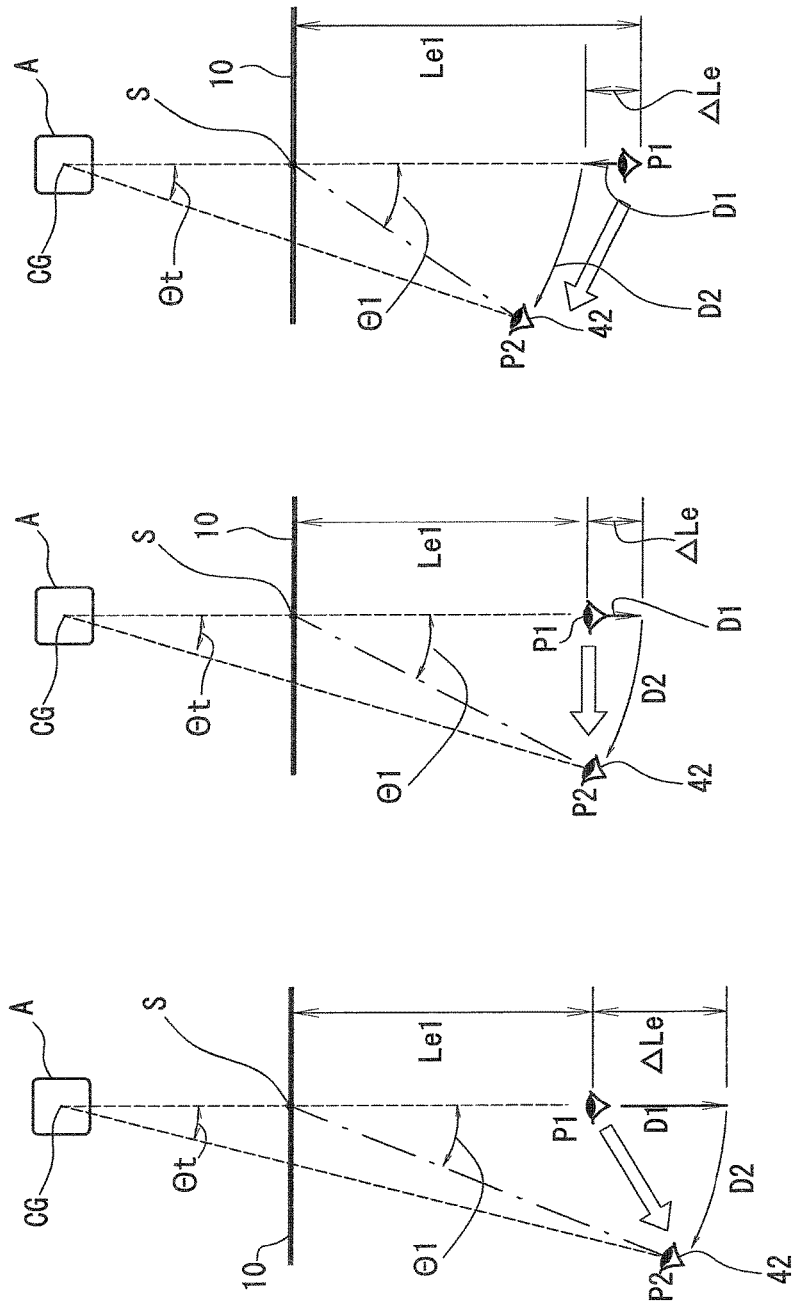
FIG. 7 is a plan view illustrating still another example of the process for selecting a 2D image on the basis of motion parallax of an observer.

With reference to FIG. 7, a combination of the circular movement (FIG. 4) and the linear movement (FIG. 6) described above will be described. A diagram (a) of FIG. 7 shows an example where the eye 42 of the observer moves from an initial position P1 to an obliquely backward position P2. In this example, even if the movement of the eye 42 from the initial position P1 to the next position P2 is linear, the movement of the eye 42 is regarded as a combination of linear backward movement D1 and circular movement D2. A diagram (b) of FIG. 7 shows an example where the eye 42 of the observer moves from the initial position P1 to a position P2 just lateral to the initial position P1. In other words, the eye 42 moves parallel to the surface of the display 10. In this example as well, even if the movement of the eye 42 from the initial position P1 to the next position P2 is linear, the movement of the eye 42 is regarded as a combination of linear backward movement D1 and circular movement D2. A diagram (c) in FIG. 7 shows an example where the eye 42 of the observer moves from the initial position P1 to an obliquely forward position P2. In this example as well, even if the movement of the eye 42 from the initial position P1 to the next position P2 is linear, the movement of the eye 42 is regarded as a combination of linear forward movement D1 and circular movement D2.

The control section 22 selects 3D information corresponding to the position P2 of the eye 42 after the positional change, and a 2D image corresponding to this 3D information, and transmits the 3D information and the 2D image to the display 10. The above-described formula (1) is applied to the circular movement D2 in FIG. 7, and the above-described formulas (2), (3), and (4) are applied to the linear away movement D1 and close movement D1 in FIG. 7. Specifically, the rotational angle ΔΘ of the object A that is 3D information after the eye 42 changes in position to P2 is obtained by formula (1). In this case, the imaging separation distance Lo and the to-display-screen separation distance Le in formula (1) are obtained by formulas (2), (3), and (4).

In the embodiment described above, the image on the display 10 is configured to change in response to a change in the relative position between the eye 42 of the observer and the display 10. In the 3D image display device 2, a displayed image is allowed to be changed even by an instruction through the input section 20. For example, enlargement/reduction of the image, that is, change of a display scaling factor, can be performed continuously or stepwise by a known technique. In addition, at the stage of collection of image data, many image data may be generated at multiple scaling factors by using a telephoto lens of the camera.

In addition, the imaging separation distance Lo can be changed and set, for example, by an instruction through the input section 20. That is, the imaging separation distance Lo can be changed and set without depending on a change in the relative position between the eye 42 of the observer and the display 10. In this embodiment, the imaging separation distance Lo in the above-described formula (1) is represented by the following formula (5).

$$Lo = Lo1/M \quad (5)$$

In this formula, Lo1 represents an imaging separation distance before change, and M represents an optionally-settable scaling factor. As described above, Lo can be changed by designation of M.

The above M exceeds 0 and is selectable as up to infinity. For example, when one image captured by the camera 32 is enlarged or reduced and displayed, M=1 may be associated with the original captured image. Then, the image with M=1 may be enlarged or reduced and displayed by the observer changing the M value at the stage of display. In addition, at the stage of generation of an image, the camera 32 may generate many image data while moving away from and close to the object to be observed. In this case, for example, the scaling factor for the image displayed initially on the screen when the display 10 is switched on can be set as M=1 beforehand. Then, the observer is allowed to continuously or intermittently change the M value through the input section 20.

When the above-described still image camera images an object to be observed while moving away from and close to the object to be observed, the imaging position does not continuously change but intermittently changes in the direction of the away/close movement. Captured image data are generated at predetermined intervals in the direction of the away/close movement. In this case, missing image data between imaging positions can be supplemented at the stage of display. In this case, first, M=1 is set for any one of many captured images. Then, a plurality of M values are newly set at predetermined pitches and between captured image data adjacent to each other in the direction of the imaging separation distance (in a range where the image data is missing). For example, M values are set at pitches of 0.01 and between captured image data with Lo=1 m and the adjacent captured image data with Lo=0.95 m. Image data resulting from enlargement/reduction corresponding to each newly-set M value is displayed at an appropriate time. This is supplement of the missing image data. As a result of this supplement, change of the image of the object to be observed on the display 10 becomes more continuous and smoother. The above supplement is not necessary for image data captured continuously by a moving image camera such as a video camera.

Although the still image has been described above as an example of an image to be displayed, a moving image can also be an image to be displayed on the 3D image display device 2. In the case where a moving image is an image to be displayed, a method for collecting image data to be stored is preferably the method shown in FIG. 2. Object to be imaged includes moving objects, animals, and the like. Moving image cameras are arranged, for example, in a cylindrical shape so as to surround the object to be imaged. All the cameras simultaneously and continuously image the object to be imaged. The position information of each camera is associated with images captured by the camera. The position information is included in the above-described 3D information and stored in the database 4 (FIG. 1).

Figure 8:
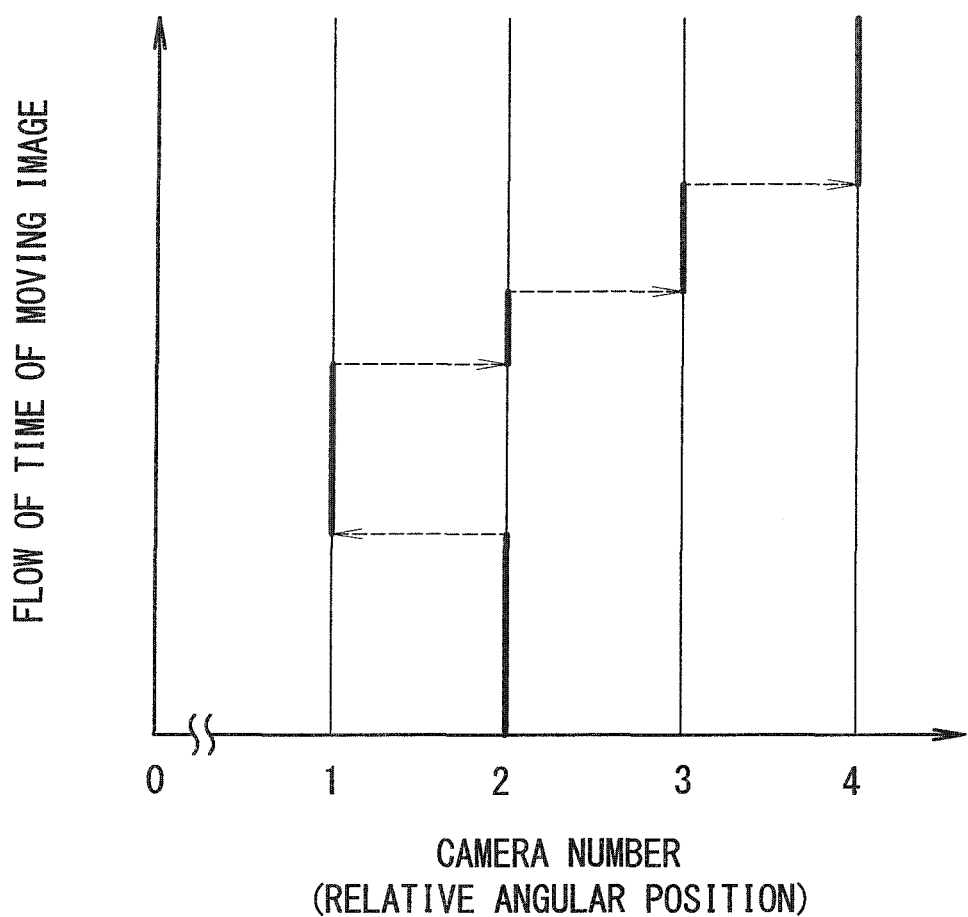
FIG. 8 is a graph showing an example of a process for reproducing a moving image obtained by the method shown in FIG. 2.

FIG. 8 is a graph showing an example of a process for reproducing the moving image. FIG. 8 illustrates an operating state of cameras arranged on a circle at a certain stage, among the cameras arranged in the cylindrical shape as shown in FIG. 2. Although not shown, a large number of cameras 32 arranged in a cylindrical shape surround an object to be imaged. However, the object to be imaged is a moving object, not a stationary object as shown in FIG. 2. Numbers 1 to 4 shown at the horizontal axis of the graph in FIG. 8 correspond to the camera numbers shown in FIG. 2. That is, the numbers 1 to 4 represent the relative angular positions of the cameras with respect to the object. In FIG. 8, each thick line along the flow of time indicates that a moving image captured by the corresponding camera is displayed. Each horizontal broken arrow indicates that a moving image, which is an image to be displayed, is changed. The change of the moving image, which is an image to be displayed, is performed by the control section 22 (FIG. 1) on the basis of a result of measurement by the motion parallax amount measurement unit 12. The description thereof is omitted, since the description has been already given with reference to FIG. 4.

In the embodiment described above, the images captured by the imaging unit such as a camera or the like have been described as the image data stored in the database 4. However, the image data is not limited to the captured image data. For example, images generated by computer graphics may be used. As a matter of course, the images include still images and moving images. The method by computer graphics is preferable since a large amount of data can be easily collected as compared to collection of data by imaging a real object.

In the embodiment described above, the image data is stored in the database 4, and image data to be displayed is selected therefrom. However, the present invention is not limited to such a method, and means equivalent to communication or live broadcasting can also be adopted. For example, in the case where the image data collecting method shown in FIG. 2 is adopted, 2D image data and 3D information obtained by all the cameras 32 are simultaneously transmitted to the display unit 8. In addition, at the same time as imaging by the cameras 32, the 2D image data and 3D information are transmitted. In this case as well, the display unit 8 operates and fulfills its function, similarly as described above. In this case, since the background of the object to be observed is often unchanged and thus image data of the background can be regarded as being approximately identical to each other, the image data of the background may be transmitted together as common information. According to this display method, an image can be displayed without time delay, similarly as in live broadcasting for television.

The above descriptions are merely illustrative examples, and various modifications can be made without departing from the principles of the present invention.

What is claimed is:

1. A three-dimensional image display device comprising:
an image display screen configured to display a two-dimensional image of an object to be observed;
a motion parallax amount measurement unit configured to measure a to-display-screen parallax angle $\Theta1$ and a to-display-screen separation distance Le with respect to the image display screen; and
a display unit configured to select, from a plurality of two-dimensional images, a two-dimensional image of the object to be observed that has rotated by an angle $\Delta\Theta$ corresponding to the to-display-screen parallax angle $\Theta1$, and transmit the two-dimensional image to the image display screen, wherein
each of the plurality of two-dimensional images is associated with three-dimensional information,
the three-dimensional information includes at least the rotational angle $\Delta\Theta$ and a virtual separation distance Lo, and
when the two-dimensional image is selected by the display unit, the rotational angle $\Delta\Theta$ of the object to be observed is determined on the basis of the following formula:

$$\Delta\Theta = \Theta1 \times Le/(Lo+Le),$$

wherein
the to-display-screen parallax angle $\Theta1$ is a motion parallax angle of an observer with respect to the image display screen and is identified by the motion parallax amount measurement unit,
the to-display-screen separation distance Le is a separation distance between an eye of the observer and the image display screen and is identified by the motion parallax amount measurement unit,
the virtual separation distance Lo is a virtual separation distance between the object to be observed and the image display screen and is determined when the image is generated, and the rotational angle $\Delta\Theta$ is a rotational angle of the object to be observed and is determined on the basis of $\Theta1$, Le, and Lo that are known.

2. The three-dimensional image display device according to claim 1, wherein
when the two-dimensional image is selected by the display unit, the to-display-screen separation distance Le in the formula is represented by the following formula:

$$Le = Le1 + \Delta Le, \text{ and}$$

the virtual separation distance Lo in the formula is represented by the following formula:

$$Lo = Lo1 + \Delta Lo,$$

wherein
Le1 in the formula is a separation distance between the eye of the observer and the image display screen before change, and is identified by the motion parallax amount measurement unit,
Lo1 in the formula is a virtual separation distance between the object to be observed and the image display screen before change, and is determined when the image is generated,
$\Delta Le$ in the formula is a change amount of the separation distance Le1 and is identified by the motion parallax amount measurement unit, and
$\Delta Lo$ in the formula is a change amount of the virtual separation distance Lo1, is included in the three-dimensional information, and is determined on the basis of the change amount $\Delta Le$.

3. The three-dimensional image display device according to claim 1, wherein the virtual separation distance from the object to be observed, the object being displayed on the image display screen, to the image display screen is freely changed and set.

4. The three-dimensional image display device according to claim 1, wherein
when the two-dimensional image is selected by the display unit, the Lo in the formula is represented by the following formula:

$$Lo = Lo1/M,$$

wherein
Lo1 in the formula is a virtual separation distance between the object to be observed and the image display screen before change, and is determined when the image is generated, and
M in the formula represents an optionally-settable scaling factor.

5. The three-dimensional image display device according to claim 1, wherein the two-dimensional image is a still image.

6. The three-dimensional image display device according to claim 1, wherein the two-dimensional image is a moving image.

7. A three-dimensional image display method comprising the steps of:
measuring a to-display-screen parallax angle $\Theta1$ and a to-display-screen separation distance Le with respect to an image display screen;
selecting, from a plurality of two-dimensional images of an object to be observed, a two-dimensional image of the object to be observed that has rotated by an angle $\Delta\Theta$ corresponding to the to-display-screen parallax angle $\Theta1$; and
displaying the two-dimensional image selected in the selecting step on the image display screen, wherein each of the plurality of two-dimensional images is associated with three-dimensional information, the three-dimensional information includes at least the rotational angle $\Delta\Theta$ and a virtual separation distance Lo, and when the two-dimensional image is selected in the selecting step, the rotational angle $\Delta\Theta$ of the object to be observed is determined on the basis of the following formula:

$$\Delta\Theta=\Theta 1 \times Le/(Lo+Le),$$

wherein the to-display-screen parallax angle $\Theta 1$ is a motion parallax angle of an observer with respect to the image display screen and is identified in the measuring step, the to-display-screen separation distance Le is a separation distance between an eye of the observer and the image display screen and is identified in the measuring step, the virtual separation distance Lo is a virtual separation distance between the object to be observed and the image display screen and is determined when the image is generated, and the rotational angle $\Delta\Theta$ is a rotational angle of the object to be observed and is determined on the basis of $\Theta 1$, Le, and Lo that are known.

8. The three-dimensional image display method according to claim 7, wherein when the two-dimensional image is selected in the selecting step, the to-display-screen separation distance Le in the formula is represented by the following formula:

$$Le=Le1+\Delta Le, \text{ and}$$

the virtual separation distance Lo in the formula is represented by the following formula:

$$Lo=Lo1+\Delta Lo,$$

wherein

Le1 in the formula is a separation distance between the eye of the observer and the image display screen before change, and is identified in the measuring step, Lo1 in the formula is a virtual separation distance between the object to be observed and the image display screen before change, and is determined when the image is generated, $\Delta Le$ in the formula is a change amount of the separation distance Le1 and is identified in the measuring step, and $\Delta Lo$ in the formula is a change amount of the virtual separation distance Lo1, is included in the three-dimensional information, and is determined on the basis of the change amount $\Delta Le$.

9. The three-dimensional image display method according to claim 7, wherein the selection of the two-dimensional image in the selecting step is either selection from two-dimensional image data stored in a database or selection from two-dimensional image data collected by a plurality of imaging units and transmitted simultaneously.

10. The three-dimensional image display method according to claim 7, wherein the two-dimensional image is a still image.

11. The three-dimensional image display method according to claim 7, wherein the two-dimensional image is a moving image.

* * * * *